United States Patent
Sol (10) Patent No.: US 6,492,619 B1
(45) Date of Patent: Dec. 10, 2002

(54) DUAL ZONE BUS BAR ARRANGEMENT FOR HEATABLE VEHICLE WINDOW

(75) Inventor: Jean-Marc Sol, Thionville (FR)

(73) Assignee: Centre Luxembourgeois de Recherches pour le Verre et la Ceramique S.A. (CRVC), Grand Duchy of Luxembourg (LU)

( * ) Notice: Subject to any disclaimer, the term of this patent is extended or adjusted under 35 U.S.C. 154(b) by 0 days.

(21) Appl. No.: 09/832,335

(22) Filed: Apr. 11, 2001

(51) Int. Cl.⁷ .................................................. H05B 3/84
(52) U.S. Cl. ........................ 219/203; 219/541; 52/171.2
(58) Field of Search ................................ 219/203, 541, 219/522; 52/171.2

(56) References Cited

U.S. PATENT DOCUMENTS

| | | | |
|---|---|---|---|
| 2,878,357 A | * 3/1959 | Thomson et al. | 219/203 |
| 3,366,777 A | * 1/1968 | Brittan et al. | 219/522 |
| 3,794,809 A | * 2/1974 | Beck et al. | 219/203 |
| 4,744,844 A | 5/1988 | Hurst | |
| 4,782,216 A | 11/1988 | Woodard | |
| 4,820,902 A | 4/1989 | Gillery | |
| 4,847,472 A | * 7/1989 | Koontz | 219/543 |
| 4,894,513 A | 1/1990 | Koontz | |
| 4,902,875 A | 2/1990 | Koontz | |
| 4,940,884 A | 7/1990 | Gillery | |
| 5,182,431 A | * 1/1993 | Koontz et al. | 219/203 |
| 5,324,374 A | 6/1994 | Harmand et al. | |
| 5,434,384 A | 7/1995 | Koontz | |
| 5,543,601 A | * 8/1996 | Bartrug et al. | 219/203 |
| 5,653,903 A | 8/1997 | Pinchok, Jr. et al. | |
| 5,824,994 A | 10/1998 | Noda et al. | |
| 5,877,473 A | 3/1999 | Koontz | |
| 2002/0015824 A1 | 2/2002 | Kawamoto et al. | |

FOREIGN PATENT DOCUMENTS

| | | | |
|---|---|---|---|
| DE | 4302005 | * | 8/1994 |
| EP | 1081987 | * | 3/2001 |

* cited by examiner

Primary Examiner—Joseph Pelham
(74) Attorney, Agent, or Firm—Nixon & Vanderhye P.C.

(57) ABSTRACT

A bus bar arrangement for a heatable vehicle window. An electroconductive coating is divided into two separate coating portions which represent two different respective heating zones. A single bottom bus bar is common to both heating zones, while a first upper/top bus bar portion is provided for the first heating zone and a different second upper/top bus bar portion is provided for the second heating zone. The two upper/top bus bars are spaced apart and electrically insulated from one another. Conductive bus bar extension portions lead from the respective upper bus bars down to a bottom edge of the window (e.g., vehicle windshield) so that electrical connectors for all three bus bars can be located along or proximate a single edge of the window.

20 Claims, 6 Drawing Sheets

DUAL ZONE BUS BAR ARRANGEMENT FOR HEATABLE VEHICLE WINDOW

This invention relates to a bus bar arrangement for a heatable vehicle window (e.g., vehicle windshield) including at least first and second heating zones. In particular, this invention relates to a bus bar arrangement including first and second spaced apart top bus bar portions which work in conjunction with a bottom bus bar to define at least first and second heating zones on a vehicle window.

BACKGROUND OF THE INVENTION

Heatable windows are known in the art. For example, see U.S. Pat. Nos. 5,434,384 and 4,782,216, the disclosures of which are hereby incorporated herein by reference. Heatable windows conventionally include first and second conductive bus bars in electrical contact with a transparent conductive coating including an electroconductive layer. The electroconductive layer generates heat when electric current is passed therethrough. In such a manner, snow and ice may be melted from vehicle windows such as windshields, backlites, sidelites, and/or the like. Windows may also be defogged in such a manner.

In conventional heatable windows, first and second bus bars are often located in spaced apart relation proximate opposite edges of the window. Unfortunately, this type of design often requires the electrical connector for the top bus bar to exit the window at the top edge thereof, and the electrical connector for the bottom bus bar to exit the window at the bottom edge thereof. This is undesirable in that it is much more convenient if both connectors (i.e., for both bus bars) are located along the same edge/side of the window.

In an attempt to overcome the aforesaid problem, U.S. Pat. No. 4,820,902 discloses first and second conductive leads/extensions arranged from opposite sides of the top bus bar heading down the respective sides of the windshield and across the bottom side/edge of the same. In such a manner it is possible to locate the electrical connectors for both bus bars at the bottom edge/side of the windshield. Unfortunately, the design of the '902 patent is undesirable in that the entire viewing zone of the windshield is heated via a single heating zone.

It will be apparent to those skilled in the art that there exists a need for a more efficient multi-zone bus bar arrangement for a vehicle window.

SUMMARY OF THE INVENTION

An object of this invention is to provide an efficient bus bar arrangement for a heatable vehicle window (e.g., windshield).

Another object of this invention is to provide a bus bar arrangement for a heatable vehicle window, wherein the bus bar arrangement defines at least first and second heating zones.

Another object of this invention is to fulfill one or more of the above-listed objects.

Generally speaking, certain example embodiments of this invention fulfill one or more of the above-listed needs by providing a heatable vehicle windshield including a top edge, a bottom edge, and first and second side edges, the heatable vehicle windshield comprising:

first and second glass substrates laminated to one another with at least a polymer inclusive interlayer therebetween;

a coating located between said first and second substrates, said coating including at least one conductive layer;

first, second, and third conductive bus bars, wherein at least portions of said first, second, and third bus bars are in electrical communication with said conductive layer of said coating, so that when electric current is passed through said conductive layer via bus bars at least a portion of the windshield is heated;

wherein a top portion of said first bus bar and a top portion of said second bus bar are located in spaced apart relation at a top area of said windshield, and said third bus bar is located at a bottom area of said windshield;

wherein a first heating zone is defined by a portion of said coating in electrical communication with and between (i) said top portion of said first bus bar, and (ii) said third bus bar, and a second heating zone is defined by a different portion of said coating in electrical communication with and between (i) said top portion of said second bus bar, and (ii) said third bus bar; and wherein connection portions of said first and second bus bars are provided proximate or adjacent the bottom edge of the windshield so that corresponding electrical connectors in electrical communication with first, second, and third bus bars, respectively, are each attached to the windshield proximate the bottom edge thereof, at least one of said electrical connectors supplying electric current to said conductive layer said coating via an external power source.

Certain other embodiments of this invention fulfill one or more of the above-listed objects by providing a heatable window comprising:

at least one substrate supporting a coating;

first, second, and third conductive bus bars, wherein at least portions of said first, second, and third bus bars are in electrical communication with a conductive layer of said coating, so that when electric current is passed through said conductive layer via bus bars at least a portion of the window is heated;

wherein a first portion of said first bus bar and a first portion of said second bus bar are located in spaced apart relation from one another at a top or upper area of said window, and said third bus bar is at least partially located at a bottom area of said window;

a first heating zone defined by a first portion of said coating in electrical communication with and between a) said first portion of said first bus bar, and b) said third bus bar;

a second heating zone defined by a second portion of said coating in electrical communication with and between a) said first portion of said second bus bar, and b) said third bus bar; and wherein connection portions of said first and second bus bars are provided proximate or adjacent a bottom edge of the window so that corresponding electrical connectors in electrical communication with the first, second, and third bus bars, respectively, are each attached to the window proximate the bottom edge thereof, at least one of said electrical connectors supplying electric current to said conductive layer of said coating via an external power source.

Still further embodiments of this invention fulfill one or more of the above-listed needs by providing a heatable window comprising:

at least one substrate supporting a heatable conductive layer; first, second, and third spaced apart bus bars each in electrical communication with said heatable conductive layer;

a first heating zone including a first portion of said conductive layer defined between a top or upper portion of said first bus bar and said third bus bar;

a second heating zone including a different second portion of said conductive layer defined between a top or upper portion of said second bus bar and said third bus bar; and wherein said top or upper portions of said first and second bus bars, respectively, are located in spaced relation from one another at a top or upper area of said window, and said third bus bar is located at a bottom area of said window.

This invention will now be described with respect to certain example embodiments thereof as illustrated in the following drawings, wherein.

IN THE DRAWINGS

DETAILED DESCRIPTION OF CERTAIN EXEMPLARY EMBODIMENTS OF THE INVENTION

Referring now more particularly to the accompanying drawings in which like reference numerals indicate like parts or layers throughout the several views.

Certain embodiments of this invention relate to a bus bar arrangement for a heatable vehicle window (e.g., windshield). First and second spaced apart elongated conductive top bus bar portions, and an elongated conductive bottom bus bar, are provided. Each bus bar is in electrical contact or communication with at least one electroconductive layer(s) of a coating (e.g., low-E coating) deposited on the window. Each top bus bar has one free end, and another end from which a conductive extension protrudes. The extension from each top bus bar leads from a location proximate the top side/edge of the windshield down along a side edge thereof to the bottom side/edge of the window. In such a manner, electrical connections or connectors for (i) both top bus bar portions, and (ii) the bottom bus bar, may all be provided along the same side/edge (e.g., along or adjacent the bottom edge) of the window (e.g., windshield). Moreover, a dual zone heating system may be provided using the two top bus bars in conjunction with the bottom bus bar.

Figure 1:
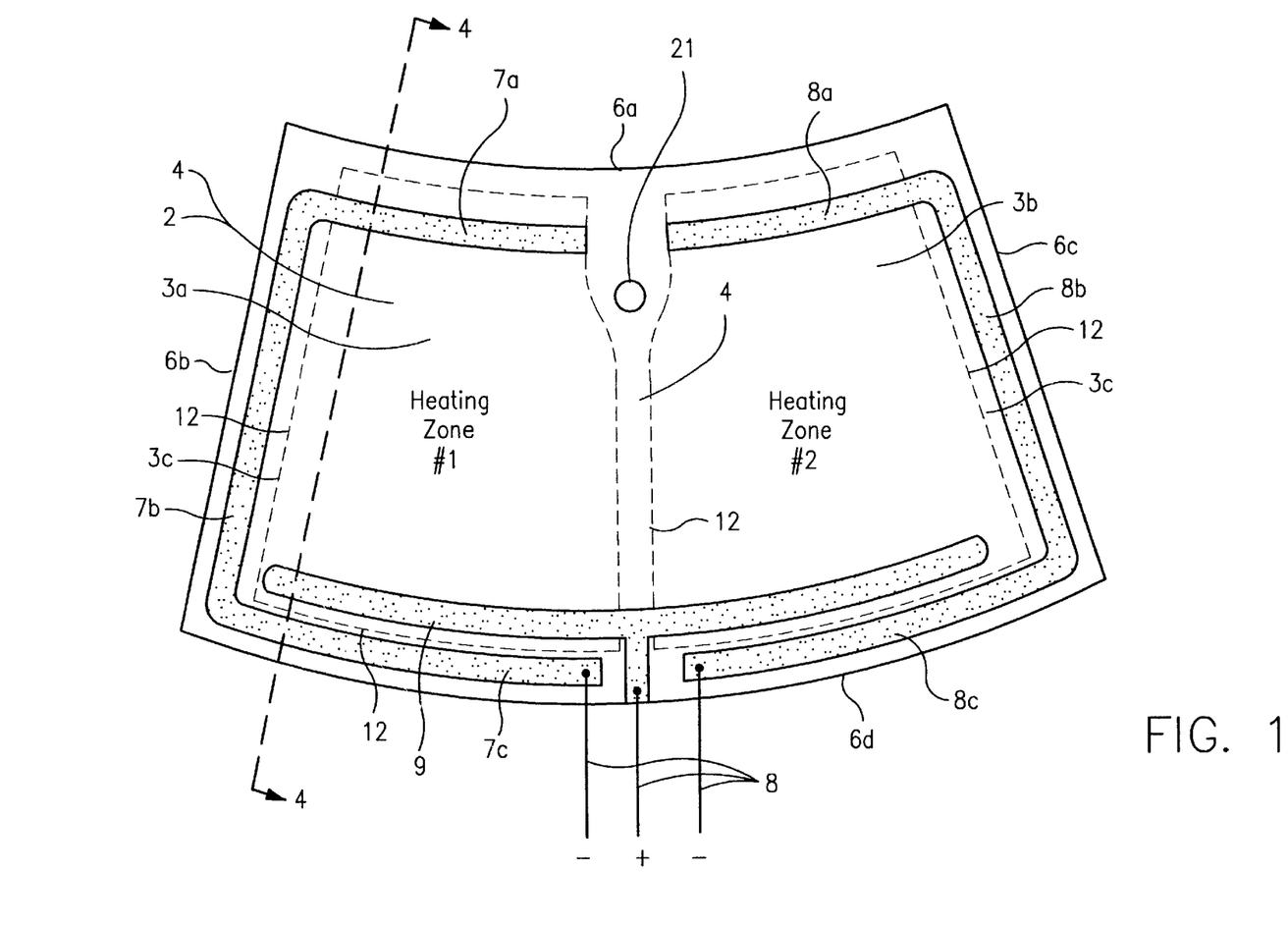
FIG. 1 is a top plan view of a heatable vehicle windshield according to an exemplary embodiment of this invention (absent opaque shielding layers for purposes of illustration simplicity).
Figure 4:
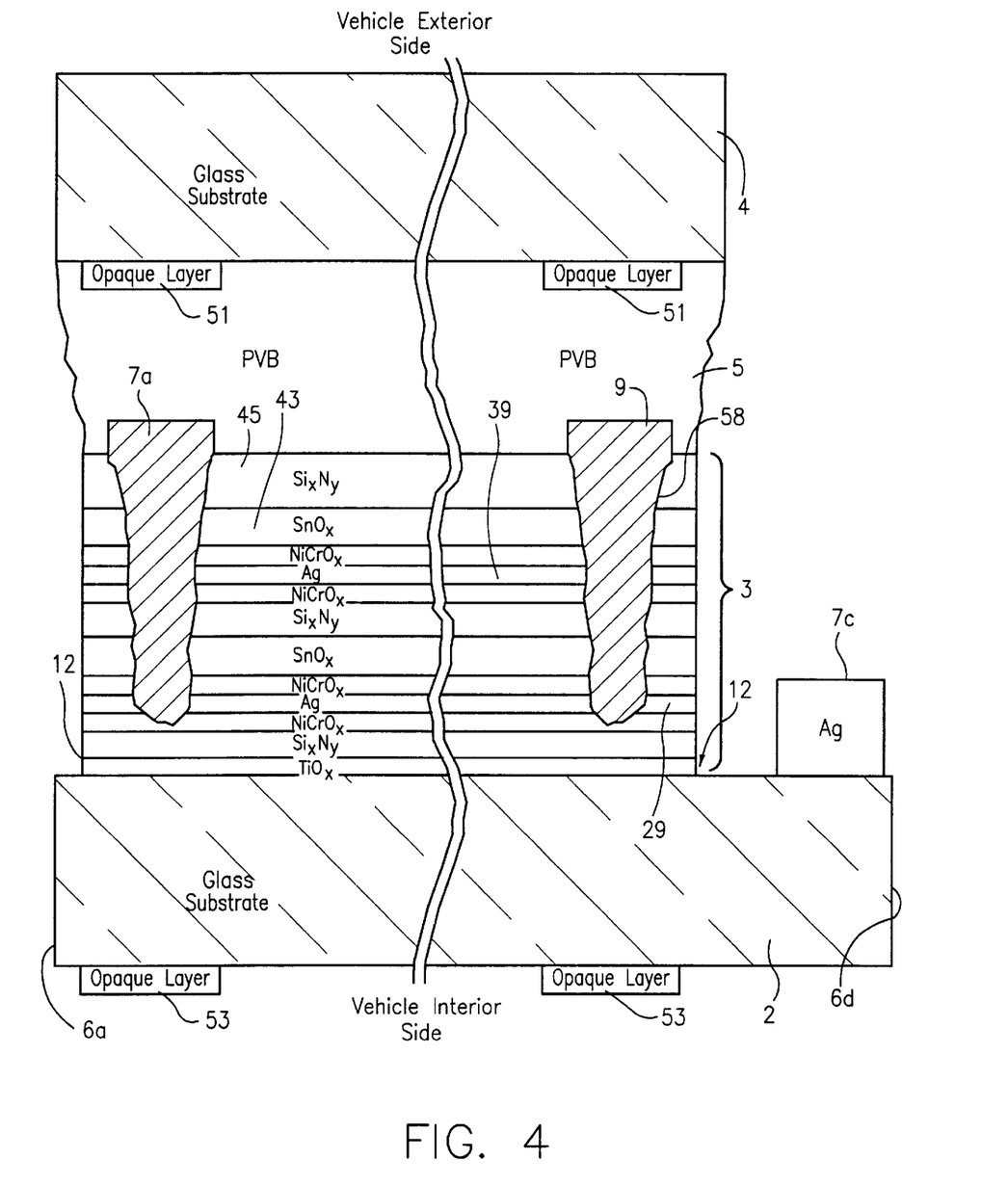
FIG. 4 is a side cross sectional view of the vehicle window of FIG. 1 (taken along Section Line 4—4 in FIG. 1), after the FIG. 3 structure has been laminated to another glass or plastic substrate with a polymer (e.g., PVB) interlayer provided therebetween to complete a vehicle windshield or other vehicle window.

FIG. 1 illustrates an example embodiment of this invention (opaque shielding layers are omitted from FIG. 1 for purposes of illustration simplicity). Referring to FIGS. 1 and 4, the vehicle windshield includes a multi-layer low-E coating 3 sandwiched between first and second glass substrates 2 and 4, respectively. Coating 3 is at least partially deleted (see deletion lines 12) in order to divide the coating 3 into a right-hand heatable coating portion 3a and a left-hand heatable coating portion 3b. Portions 3a and 3b of the coating are spaced apart from one another (i.e., see insulating area 4 between the coating portions 3a and 3b, this insulating area being formed by deletion 12 near the central area of the window), and optionally may be electrically insulated from one another. For purposes of example only, it is noted that insulating area 4 can be formed in the shape of a fine line (e.g., providing a gap of about 0.5 mm or less) using laser deletion techniques. A polyvinyl butyral (PVB) interlayer 5 is provided between the substrates for conventional lamination purposes. According to certain embodiments of this invention, the multi-layer coating 3 is provided on the interior surface of one of substrates 2, 4, so that the coating is provided on what is known conventionally as the windshield's #2 or #3 surface. The window or windshield shown in FIG. 1 includes top side/edge 6a, side edges 6b and 6c, and bottom side/edge 6d. Optionally, rain sensor 21 may be located on the window or windshield in an area free of coating 3.

First, second, and third electroconductive elongated bus bars 7, 8 and 9 are provided between the substrates 2, 4, so as to be in electrical contact with at least one electroconductive layer of the multi-layer coating 3. First bus bar 7 includes top bus bar portion 7a, extension portion 7b provided along or adjacent window edge 6b, and connection portion 7c provided along or adjacent bottom window edge 6d. Top bus bar portion 7a of bus bar 7 is in electrical contact/communication with a top portion of coating portion 3a, while portions 7b and 7c of bus bar 7 are spaced from and electrically insulated from coating 3 (i.e., coating deletion line 12 illustrates the edge of the coating in FIG. 1). Bottom bus bar 9 is also in electrical contact communication with coating portion 3a (i.e., at a bottom portion of portion 3a). When electric current is passed through the electroconductive layer(s) of the coating portion 3a via bus bars 7a and 9 (using electrical connectors/leads 8), heat is generated by coating portion 3a in heating zone #1 in order to defog, defrost, and/or melt ice/snow from the vehicle window. Electrical connections/connectors 8 supply power to the coating 3 via bus bars from an external power source. An exemplary external power source may be a DC battery of the vehicle, and is represented by "+" and "−" in FIG. 1.

Second bus bar 8 includes top bus bar portion 8a, extension portion 8b provided along or adjacent window edge 6c, and connection portion 8c provided along or adjacent bottom window edge 6d. Top bus bar portion 8a of bus bar 8 is in electrical contact/communication with a top portion of right-hand coating portion 3b, while portions 8b and 8c of bus bar 8 are spaced from and electrically insulated from coating 3. Bottom or third bus bar 9 is also in electrical contact communication with coating portion 3b (i.e., at a bottom area of portion 3b). When electric current is passed through the electroconductive layer(s) of the coating portion 3b via bus bars 8a and 9 (using electrical connectors/leads 8), heat is generated by coating portion 3b in heating zone #2 in order to defog, defrost, and/or melt ice/snow from the vehicle window. Thus, the heating system shown in FIG. 1 includes at least first and second different heating ezones; the first heating zone #1 including coating portion 3a which receives electric current via bus bars 7a and 9, and the second heating zone #2 including coating portion 3b which receives electric current via bus bars 8a and 9. In certain embodiments of this invention, both heating zones are heated simultaneously, while in other embodiments of this invention the two different heating zones may be selectively heated (i.e., one may be heated independent of the other, e.g., thereby enabling the driver side of the window to be defrosted and thereafter the passenger side of the windshield in order to save power).

Referring in particular to FIG. 1, top bus bar portions 7a and 8a are provided at a top area of the windshield proximate top edge 6a, and are spaced apart from one another so as to not be in electrical communication. Meanwhile, bottom bus bar 9 is provided at a bottom area of the windshield proximate a wiper rest area and bottom edge 6d. Thus, top and bottom bus bars 7a and 9 (and 8a and 9) are provided at opposite sides/edges of the windshield. Free ends 7e and 8e of upper bus bar portions 7a and 8a, respectively, terminate proximate coating deletion line 12 on opposite sides of optional insulating gap 4 in the coating. Conductive extensions 7b and 8b extend from the other ends of the respective upper bus bar portions down to a bottom side/edge of the windshield so that electrical connectors 8 for all three bus bars 7–9 can be located on one side of the windshield, and preferably in approximately the same area. Portions of coating 3 proximate the edge(s) of the substrate 2 are deleted (i.e., referred to as edge deletion) so that extensions 7b and 8b are electrically insulated from coating 3 and bus bar 9.

Still referring to FIG. 1, portions 7a, 8a are approximately parallel to portions 7c, 6c, respectively, as well as to top edge 6a and bus bar 9. Portions 7b, 8b are approximately parallel to edges 6b, 6c, respectively, in certain embodiments. Portions 7c, 8c are both approximately parallel to bottom window edge 6d at certain locations. As shown in FIG. 1, portions 7c, 8c are spaced from and electrically insulated from both coating 3 and bus bar 9. Likewise, portions 7b, 8b are spaced from and electrically insulated from side edges 3c of coating 3.

It is noted that conductive bus bar portions 7a–7c and 8a–8c (and/or bus bars 7, 9) are said to be located "adjacent" or "along" an edge(s) of the windshield, even though they may (and are preferably) spaced inwardly from the relevant edge(s) of the windshield at least one or more inches. Thus, when used relative to an edge of the window or windshield, the words "adjacent" and "along" as used herein mean that at least a portion of the conductive bus bar portion or bus bar (i.e., any of 7, 8 or 9) is/are within about six (6) inches of the mentioned edge of the windshield.

Figure 2:
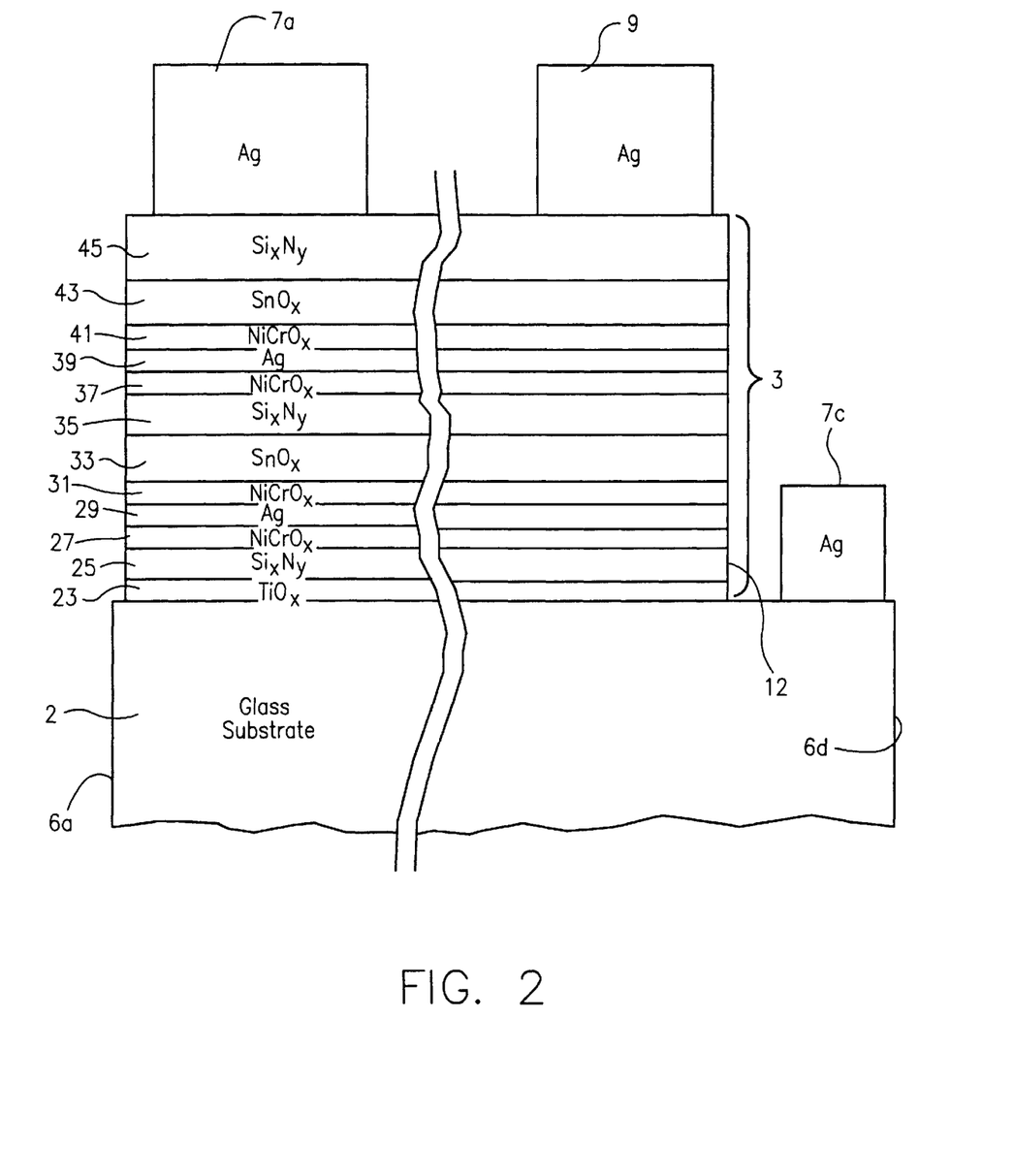
FIG. 2 is a side cross sectional view of a multi-layer coating provided on one of the substrates of the vehicle windshield of FIG. 1, with a pair of silver (Ag) frit inclusive bus bars deposited on the substrate over the coating, during the process of manufacturing the windshield of FIG. 1 (at section line 4—4 shown in FIG. 1).
Figure 3:
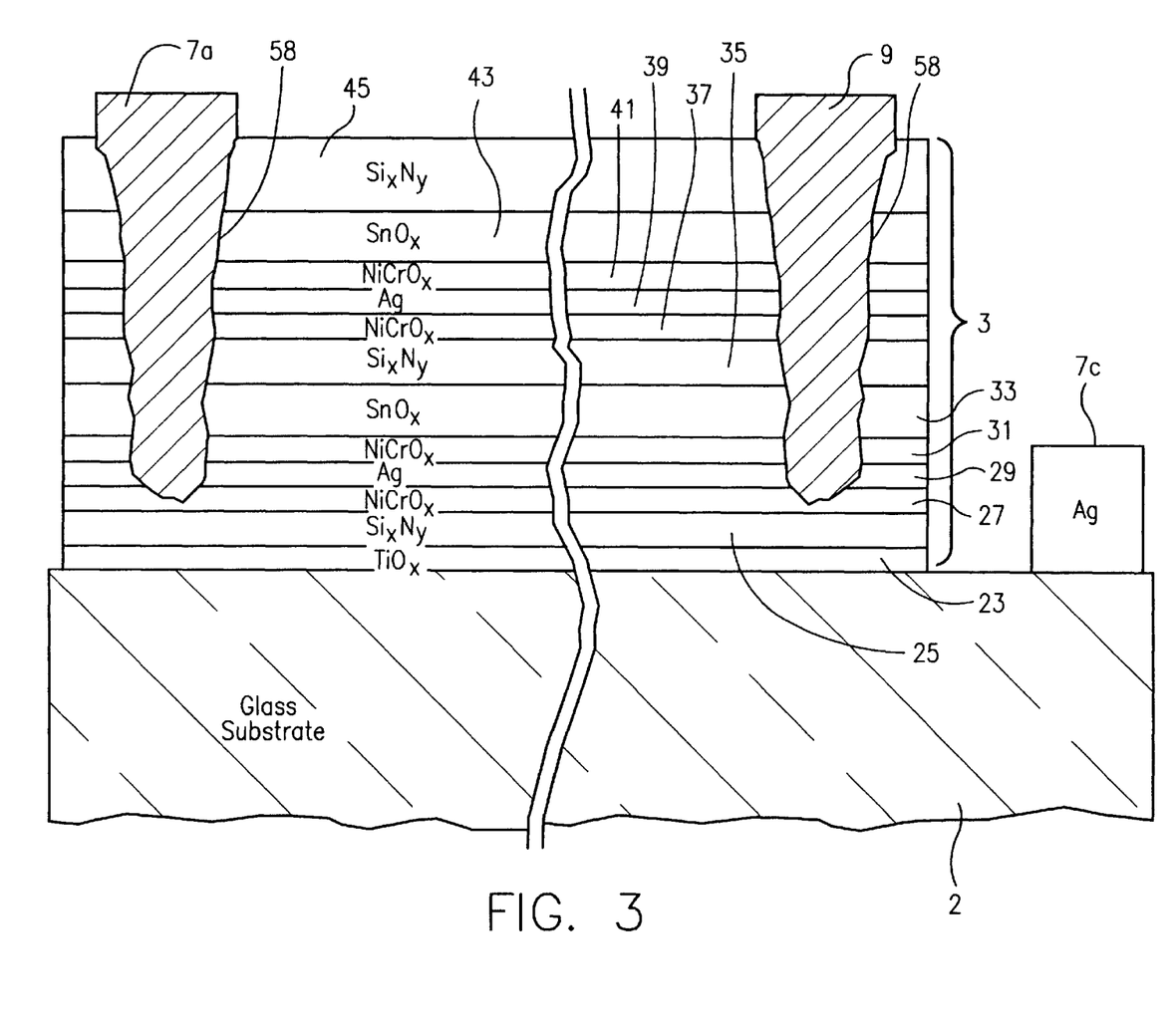
FIG. 3 is a side cross sectional view of the bus bars and coating of FIG. 2, after and/or during heating which causes at least a portion of the bus bars to bleed through at least one dielectric layer of the coating and come into contact with at least one of the electroconductive silver (Ag) layers of the coating thereby establishing an electrical connection with the same.

Referring to FIGS. 2–4, an exemplary method of making the heatable windshield(s) of FIG. 1 will now be described. The materials illustrated for the various layers in FIGS. 2–4 are for purposes of example only. Initially, float glass (e.g., soda-lime-silica glass) substrate 2 is provided. Substrate 2 is from about 1.0 to 10.0 mm thick, more preferably from about 1.6 mm to 4 mm thick. Low-E coating 3 is deposited on substrate 2. Multi-layer coating 3 includes first dielectric anti-reflection layer 23, second dielectric haze-reducing layer 25, first lower contact layer 27 (which contacts layer 29), first electroconductive metallic infrared (IR) reflecting layer 29, first upper contact layer 31 (which contacts layer 29), third dielectric layer 33 (which may be deposited in one or multiple steps in different embodiments of this invention), fourth dielectric layer 35, second lower contact layer 37 (which contacts layer 39), second electroconductive metallic IR reflecting layer 39, second upper contact layer 41 (which contacts layer 39), fifth dielectric layer 43, and finally sixth protective dielectric layer 45. The "contact" layers each contact at least one IR reflecting layer. The aforesaid layers 23–45 make up heat treatable low-E (i.e., low emissivity) coating 3 which is provided on substrate 2.

In certain embodiments of this invention, first dielectric layer 23 may be of or include titanium dioxide ($TiO_x$ where x is from 1.7 to 2.3, most preferably 2.0), silicon nitride ($Si_xN_y$ where x/y may be about 0.75 (i.e., $Si_3N_4$), or alternatively x/y may be from about 0.76 to 1.5 in Si-rich embodiments), silicon dioxide ($SiO_x$ where x is from 1.7 to 2.3, most preferably about 2.0), niobium oxide (e.g., $Nb_2O_5$), SiZrN, tin oxide, zinc oxide, silicon oxynitride, or any other suitable dielectric material. First dielectric layer 23 functions as an antireflection layer in certain embodiments of this invention.

Second dielectric layer 25 may function to reduce haze in certain embodiments of this invention, and is preferably of or includes silicon nitride (e.g., $Si_3N_4$, or alternatively silicon-rich silicon nitride $Si_xN_y$ where x/y is from 0.76 to 1.5, more preferably from 0.85 to 1.2). When sputtering silicon nitride layer(s) herein, a Si target may be used, or alternatively a target including Si admixed with up to 3–20% by weight aluminum and/or stainless steel (e.g. SS#316) may be used, with about this amount of aluminum and/or steel then appearing in the layer(s) so formed. Other materials may also be used for haze reducing layer 25, including but not limited to SiZrN.

While $Si_3N_4$ may be used for layer 25 (and/or layer 35) in certain embodiments, it has been found that a silicon rich type of silicon nitride as layer 25 is better at reducing haze and/or improving mechanical durability in certain embodiments of this invention. Absent this layer 25 (and/or 35), haze tends to be at least 0.45; whereas with this layer(s) it is reduced to no greater than 0.4 as discussed herein. In Si-rich silicon nitride embodiments, layer 25 (and/or layer 35) is of or includes $Si_xN_y$ where x/y is from 0.76 to 1.5, more preferably from about 0.85 to 1.2. $Si_3N_4$ has an index of refraction "n" of about 2.04, and an extinction coefficient "k" of about 0. Si-rich silicon nitride according to certain embodiments of this invention may have an index of refraction of at least about 2.05, more preferably of at least about 2.07, and may be 2.08 (at 550 and/or 632 nm) in exemplary embodiments. Also, Si-rich silicon nitride according to certain embodiments of this invention may have an extinction coefficient "k" of at least about 0.001, and more preferably of at least about 0.003. In a first monolithic example after HT of a Si-rich nitride layer 5 (and/or 15), "n" was 2.099 and "k" was 0.0034; while in a second monolithic example after HT "n" was 2.168 and "k" was 0.014. Si-rich silicon nitride, in addition to being better at reducing haze than $Si_3N_4$, has also been found to adhere better to the titanium oxide of layer 23 in example embodiments. Surprisingly, it has also been found that Si-rich silicon nitride under the $NiCrO_x$ and Ag layers provides a lower sheet resistance ($R_s$).

Electroconductive (or simply conductive) infrared (IR) reflecting layers 29 and 39 are preferably metallic and conductive, and may be made of or include silver (Ag), gold, or any other suitable IR reflecting material. However, metallic Ag is the material of choice for the IR reflecting layers 29 and 39 in certain example embodiments of this invention. These IR reflecting layers help enable coating 3 to have low-E characteristics, as well as heatability.

Contact layers 27, 31, 37, and 41 are of or include nickel (Ni) oxide, or a nickel alloy oxide such as nickel chrome oxide (NiCrO$_x$), in preferred embodiments of this invention. NiCrO$_x$ layers 27, 31, 37, and/or 41 may be fully oxidized in certain embodiments of this invention (i.e., fully stochiometric), or may be at least about 75% oxidized in other embodiments of this invention. While NiCrO$_x$ is a preferred material for layers 27, 31, 37 and/or 41, those skilled in the art will recognize that other materials may instead be used (e.g., oxides of Ni, oxides of Ni alloys, oxides of Cr, oxides of Cr alloys, NiCrO$_x$N$_y$, or any other suitable material) for one or more of these layers. It is noted that contact layers 27, 31, 37 and/or 41 may or may not be continuous in different embodiments of this invention.

When layers 27, 31, 37 and/or 41 comprise NiCrO$_x$ in certain embodiments, the Ni and Cr may be provided in different amounts, such as in the form of nichrome by weight about 80–90% Ni and 10–20% Cr. An exemplary sputtering target for depositing these layers includes not only SS-316 which consists essentially of 10% Ni and 90% other ingredients, mainly Fe and Cr, but Haynes 214 alloy as well, which by weight consists essentially of (as a nominal composition) the following materials which may also show up in these layers:

| Element | Weight % |
|---------|----------|
| Ni | 75.45 |
| Fe | 4.00 |
| Cr | 16.00 |
| C | .04 |
| Al | 4.50 |
| Y | .01 |

One or more of contact layers 27, 31, 37, and/or 41 (e.g., of or including NiCrO$_x$) is/are preferably oxidation graded in certain embodiments of this invention so that the degree of oxidation in the layer(s) changes throughout the thickness of the layer(s). For example, one or more of contact layers (27, 31, 37 and/or 41) may be graded so as to be less oxidized at the contact interface with the immediately adjacent IR reflecting layer (29 or 39) than at a portion of the contact layer(s) further or more/most distant from the immediately adjacent IR reflecting layer. It is believed that oxidation grading of one or more of contact layer(s) enables the low-E coating 3 to achieve the combination of heat treatability and high visible transmission (which was not previously achievable using NiCrO$_x$ contact layers in a dual silver low-E coating system.

Still referring to FIG. 2, third dielectric layer 33 acts as a coupling layer between the two halves of the coating 3, and is of or includes tin oxide in certain embodiments of this invention. However, other dielectric materials may instead be used for layer 33, including but not limited to silicon nitride, titanium dioxide, niobium oxide, silicon oxynitride, zinc oxide, or the like. Fourth dielectric layer 35 functions as a haze reducer in certain embodiments of this invention, and is preferably of or includes silicon nitride (e.g., Si$_3$N$_4$, or alternatively silicon-rich silicon nitride discussed above). However, in alternative embodiments of this invention, other materials (e.g., SiZrN) may instead be used for dielectric layer 35.

Fifth dielectric layer 43 may be of or include tin oxide in certain embodiments of this invention. However, other dielectric materials may instead be used for layer 43, including but not limited to silicon nitride, titanium dioxide, niobium oxide, silicon oxynitride, zinc oxide, or the like. Protective overcoat dielectric layer 45 is provided at least for durability purposes, and may be of or include silicon nitride (e.g., Si$_3$N$_4$) in certain embodiments of this invention. However, other dielectric materials may instead be used for layer 45, including but not limited to titanium dioxide, silicon oxynitride, tin oxide, zinc oxide, niobium oxide, SiZrN, or the like.

Other layer(s) below or above the illustrated coating 3 may also be provided. Thus, while the layer system or coating 3 is "on" or "supported by" substrate 2 (directly or indirectly), other layer(s) may be provided therebetween. Thus, for example, coating 3 of FIG. 2 may be considered "on" and "supported by" the substrate 2 even if other layer(s) are provided between layer 23 and substrate 2. Moreover, certain layers of coating 3 may be removed in certain embodiments, while others may be added in other embodiments of this invention without departing from the overall spirit of certain embodiments of this invention.

While various thicknesses may be used for the layers of multi-layer coating 3, exemplary thicknesses and example materials for the respective layers on the glass substrate 2 are as follows:

TABLE 1

(Example Materials/Thicknesses for Coating 3)

| Layer | Preferred Range (Å) | More Preferred (Å) | Example (Å) |
|-------|---------------------|--------------------|-----------  |
| TiO$_2$ (layer 23) | 0–400 Å | 50–250 Å | 100 Å |
| Si$_x$N$_y$ (layer 25) | 0–400 Å | 50–250 Å | 170 Å |
| NiCrO$_x$ (layer 27) | 5–100 Å | 10–50 Å | 18 Å |
| Ag (layer 29) | 50–250 Å | 80–120 Å | 105 Å |
| NiCrO$_x$ (layer 31) | 5–100 Å | 10–50 Å | 16 Å |
| SnO$_2$ (layer 33) | 0–800 Å | 500–850 Å | 650 Å |
| Si$_x$N$_y$ (layer 35) | 0–800 Å | 50–250 Å | 170 Å |
| NiCrO$_x$ (layer 37) | 5–100 Å | 10–50 Å | 18 Å |
| Ag (layer 39) | 50–250 Å | 80–120 Å | 105 Å |
| NiCrO$_x$ (layer 41) | 5–100 Å | 10–50 Å | 16 Å |
| SnO$_2$ (layer 43) | 0–500 Å | 100–300 Å | 150 Å |
| Si$_3$N$_4$ (layer 45) | 0–500 Å | 100–300 Å | 250 Å |

In other example embodiments, dielectric layer 23 may be removed, and/or layers 23 and 25 may be replaced with a single silicon nitride layer of either Si$_3$N$_4$ or of the Si-rich type of silicon nitride described above.

In certain exemplary embodiments of this invention, coating/layer systems 3 according to example embodiments have the following low-E characteristics before/after heat treatment (HT) when in monolithic form, as set forth in Table 2:

TABLE 2

Monolithic Before/After Heat Treatment (HT)

| Characteristic | General | More Preferred | Most Preferred |
|----------------|---------|----------------|----------------|
| R$_s$ (ohms/sq.)(before HT): | ≦10.0 | ≦8.0 | ≦5.0 |
| R$_s$ (ohms/sq.)(after HT): | ≦8.0 | ≦6.0 | ≦4.0 |
| E$_n$ (before HT): | ≦0.08 | ≦0.06 | n/a |
| E$_n$ (after HT): | ≦0.07 | ≦0.05 | n/a |
| Haze (after HT): | ≦0.40 | ≦0.30 | ≦0.28 |

An example low-E coating 3 was deposited as follows on substrate 2 using a Leybold Terra-G six-chamber sputter coating apparatus. Five cathodes were in each chamber, so there were a total of 30 cathode targets in the sputter coater. Cathode numbering utilizes the first digit to refer to the coater chamber, and the second digit to refer to the cathode position in that chamber. For example, cathode #32 was the second cathode (second digit) in the third (first digit) sputter chamber. Cathode #s C13, C14, C23, C62, C31, C32, C62, C64 and C65 were Twin Mag II type cathodes; cathode #C42 was a dual C-Mag type cathode; and cathode #s C44, C51, and C53 were planar cathodes. In the sputter coater, layers 27–31 and 37–41 were sputtered onto the substrate using DC power sputtering, while the other layers were sputtered onto the substrate using a mid-frequency AC type system. Below, "*" means Al content of approximately 10%. The line speed was 2.6 meters per minute (m/min.). All gas flows (e.g., oxygen, argon, nitrogen) are presented in units of mL/minute. In the below examples, though not shown in the charts, the oxygen flow was turned off at the sides of the NiCr targets discussed above in order to oxidation grade the contact layers 31 and 41 so that they were more oxidized further from the Ag layer(s). Volts refers to cathode volts, and amps (A) refers to cathode amps. "Tr" stands for trim; and trim (Tr) console, trim (Tr) Mid, and trim (Tr) pump are all measured in mL/minute. Pressure is measured in mbar× $10^{-3}$. Trim gas refers to individually adjusted gas flows along the cathode length to make corrections regarding layer thickness uniformity. The NiCr targets were approximately 80/20 NiCr. The process is broken into three separate charts (i.e., Part #s 1–3) because so much information is presented; only the cathode and target data is provided for all three charts for ease of reference. Both silicon nitride layers 25 and 35 were Si-rich through their entire thickness(es); as can be seen by the fact that much more inert argon (Ar) gas than nitrogen gas was used in sputtering these silicon nitride layers.

TABLE 3

Coater Setup/Processes for Coating 3

(Part #1)

| Cathode | Target | Volts (V) | Power (kW) | Ar Flow (mL/min) | O₂ Flow (mL/min) | N₂ Flow |
|---|---|---|---|---|---|---|
| #13 | Ti | 743 | 73 | 200 | 25 | 80 |
| #14 | Ti | 703 | 64 | 200 | 35 | 50 |
| #23 | Ti | 738 | 63.5 | 200 | 35 | 50 |
| #42 | Si* | 456 | 29.7 | 225 | 0 | 165 |
| #44 | NiCr | 370 | 4.3 | 150 | 38 | 0 |
| #51 | Ag | 432 | 3.2 | 100 | 0 | 0 |
| #53 | NiCr | 386 | 4.1 | 150 | 48 | 0 |
| #62 | Sn | 431 | 18.3 | 200 | 240 | 100 |
| #31 | Sn | 477 | 24.2 | 200 | 290 | 100 |
| #32 | Sn | 428 | 24.5 | 200 | 300 | 100 |
| #42 | Si* | 453 | 30.2 | 225 | 0 | 165 |
| #44 | NiCr | 360 | 4.2 | 150 | 38 | 0 |
| #51 | Ag | 430 | 3.2 | 100 | 0 | 0 |
| #53 | NiCr | 380 | 4.1 | 150 | 48 | 0 |
| #62 | Sn | 442 | 18.4 | 200 | 240 | 100 |
| #64 | Si* | 554 | 40.6 | 200 | 0 | 200 |
| #65 | Si* | 545 | 40.3 | 250 | 0 | 200 |

(Part #2 continued from Part #1 above[cathode/target in common])

| Cathode | Target | Amps (A) | Tank Voltage (V) | Freq. (kHz) | Trim Gas |
|---|---|---|---|---|---|
| #13 | Ti | 128 | 364 | 26.7 | O₂ |
| #14 | Ti | 125 | 346 | 26.7 | O₂ |
| #23 | Ti | 110 | 344 | 26.5 | O₂ |
| #42 | Si* | n/a | 230 | 26.18 | N₂ |
| #44 | NiCr | 11.4 | 0 | 0 | Ar |
| #51 | Ag | 7.4 | 0 | 0 | Ar |
| #53 | NiCr | 10.7 | 0 | 0 | Ar |
| #62 | Sn | 45 | 203 | 25.03 | O₂ |
| #31 | Sn | 61 | 224 | 25.6 | O₂ |
| #32 | Sn | 60 | 225 | 25.64 | O₂ |
| #42 | Si* | n/a | 230 | 26.18 | N₂ |
| #44 | NiCr | 11.6 | 0 | 0 | Ar |
| #51 | Ag | 7.4 | 0 | 0 | Ar |
| #53 | NiCr | 10.5 | 0 | 0 | Ar |
| #62 | Sn | 42 | 208 | 25.1 | O₂ |
| #64 | Si* | 93.5 | 264 | 26.4 | N₂ |
| #65 | Si* | 93.5 | 273 | 26.2 | N₂ |

(Part #3 continued from Parts #1–2 above[cathode/target in common])

| Cathode | Target | Tr Console | Tr Mid | Tr Pump | Pressure | Lambda | Lambda active |
|---|---|---|---|---|---|---|---|
| #13 | Ti | 7.5 | 15 | 7.5 | 2.79E−03 | 252 | True |
| #14 | Ti | 12.5 | 25 | 12.5 | 3.03E−03 | 252 | True |
| #23 | Ti | 7.5 | 35 | 7.5 | 4.83E−03 | 252 | True |
| #42 | Si* | 50 | 5 | 45 | 2.18E−03 | 0 | False |
| #44 | NiCr | 15 | 70 | 15 | 2.26E−03 | 0 | False |
| #51 | Ag | 15 | 70 | 15 | 1.37E−03 | 0 | False |
| #53 | NiCr | 15 | 70 | 15 | 2.16E−03 | 0 | False |
| #62 | Sn | 15 | 70 | 15 | 2.12E−03 | 220 | True |
| #31 | Sn | 15 | 70 | 15 | 2.97E−03 | 220 | True |
| #32 | Sn | 15 | 70 | 15 | 3.19E−03 | 220 | True |
| #42 | Si* | 50 | 5 | 45 | 2.52E−03 | 0 | False |
| #44 | NiCr | 15 | 70 | 15 | 2.30E−03 | 0 | False |
| #51 | Ag | 15 | 70 | 15 | 1.44E−03 | 0 | False |
| #53 | NiCr | 15 | 70 | 15 | 2.38E−03 | 0 | False |
| #62 | Sn | 15 | 70 | 15 | 2.24E−03 | 220 | True |
| #64 | Si* | 20 | 60 | 20 | 2.88E−03 | 0 | False |
| #65 | Si* | 20 | 60 | 20 | 3.61E−03 | 0 | False |

After the example of coating 3 was sputtered onto substrate 2 in accordance with the above, it was tested/measured as follows in Table 4 (i.e., in a monolithic state). Heat treatment (HT) was performed by placing the coated articles into a furnace heated to about 625 degrees C for about five (5) minutes, for purposes of simulating heat bending and/or tempering.

TABLE 4

Coating 3 Properties Before/After Heat Treatment (HT)[Monolithic]

| Characteristic | Example of Coating 3 |
|---|---|
| $T_{vis}$, Ill. A, 2° (before HT): | ≧70% |
| $T_{vis}$, Ill. A, 2° (after HT): | ≧78% |
| $R_s$ (ohms/sq.)(before HT): | 4.43 |
| $R_s$ (ohms/sq.)(after HT): | 3.46 |
| $E_n$ (before HT): | ≦0.06 |
| $E_n$ (after HT): | ≦0.05 |
| Haze (after HT): | 0.15 |

Referring to FIG. 4, after coating 3 has been sputtered onto substrate 2, the coating is deleted at certain areas of the substrate 2 as shown by deletion lines 12. The coating 3 is deleted in an approximately elongated area extending from top to bottom of the window (or vice versa) near the center thereof to form electrically insulating gap 4 between coating portions 3a and 3b. The coating 3 is also deleted proximate edges 6a–6d of the window or windshield, so that for example, bus bar portions 7b, 7c, 8b and 8c are located in areas where the coating 3 is not present so that these bus bar portions are electrically insulated from coating 3 and bottom bus bar 9.

Referring to FIGS. 1–2, after coating 3 has been deleted from certain areas of substrate 2 as shown by deletion lines 12 in FIG. 1, bus bars 7, 8 and 9 (e.g., of or including Ag inclusive frit) are silk screen deposited/printed on substrate 2. The conductive bus bars 7–9 are deposited on the substrate 2 over coating 3 in areas where the bus bars are to be in contact with the coating so as to contact the outer coating surface (e.g., much of bus bar 9 is deposited over the coating, as are bus bar portions 7a and 8a). For example, see bus bar portion 7a and bus bar 9 in FIG. 2 as deposited on the substrate 2 over coating 3. However, in areas where coating 3 has been deleted, the bus bars are deposited directly on the substrate or alternatively on the substrate over an opaque enamel layer or the like (e.g., see bus bar portion 7c in FIG. 2). After deposition of the bus bars 7–9, in areas where the bus bars are provided over the coating 3 dielectric layers 43 and 45 of coating 3 are located between the bus bars 7, 9 and the electroconductive layers 29, 39 of coating 3. Thus, the bus bars are not in electrical contact with conductive layers 29, 39 at this time (see FIG. 2). In certain embodiments of this invention, bus bars 7–9 are each from about 2 to 20 μm thick, more preferably from about 5–15 μm thick, and sometimes about 10 μm thick. Accordingly, bus bars 7–9 are much thicker than layers of coating 3 as deposited, although the drawings do not necessarily illustrate this for purposes of simplicity.

Referring to FIGS. 2–3, the FIG. 2 structure (with bus bar 9 and portions 7a, 8a on substrate 2 over coating 3, and extensions 7b, 7c, 8b and 8c directly on substrate 2) is then heated (e.g., to a temperature of at least 400 degrees C, more preferably from about 500 to 700 degrees C) for a period of time (e.g., at least one minute, more preferably from about 3–15 minutes) so that the bus bars become molten or at least reach a flowable semi-molten state (i.e., the transition/transformation and/or flowable temperature of bus bars 7–9 may be less than that of layers 29 and 39). In certain example embodiments, this heating is also used for heat bending the coated article of FIGS. 2–3 into the desired windshield shape in windshield embodiments (i.e., the bus bar 9 and portions 7a, 8a flow into contact with the Ag layers of the coating during the heat bending process). In alternative embodiments, this heating may be different from any heat bending.

During this bus bar bleeding heating step (which may or may not be performed simultaneously with heat bending), it has surprisingly been found that at least portions of molten or semi-molten bus bars 7a, 8a, and 9 bleed/flow and/or migrate downward through at least dielectric layers 43 and 45 of coating 3 until coming into contact with conductive layer(s) 39 and/or 29 of coating 3 as shown in FIG. 3. The portions of bus bars 7–9 extending below the surface of coating 3 (i.e., below the outer surface of layer 45) may be referred to as the run-off or bleeded portion(s) of the bus bar(s). The bus bars and/or coating may be heated to an extent such that the bus bars end up contacting only one conductive layer 39, or alternatively to an extent such that the bus bars end up contact both conductive layers 29 and 39 of coating 3 though contact holes 58 formed in coating 3 (the contact holes 58 are formed in at least layers 41, 43 and 45 by the bleeding downward of the bus bar material). The bleeding of the bus bar 9 and bus bar portions 7a, 8a may or may not reach substrate 2 in different embodiments of this invention, depending upon how long and to what temperature the FIG. 2 structure is heated. In preferred embodiments, after this heating/bleeding step and subsequent cooling and solidifying of the bus bar 9 and portions 7a, 8a, the newly formed bus bar 9 and bus bar portions 7a, 8a are now in electrical contact with conductive layers 29 and 39 as shown in FIG. 3 while still retaining their presence at the upper surface of coating 3 so that they can be in electrical contact with connectors 8 and/or extensions 7b, 8b. Because conductive bus bar portions 7b, 7c, 8b and 8c are not over coating 3, significant bleeding of the same does not occur during this heating step.

Connectors 8 may be attached to the bus bar 9 and/or bus bar portions 7c, 8c at this point in the process (i.e., before lamination to another substrate). However, in alternative embodiments of this invention, the connectors 8 may be soldered onto the bus bars following the autoclave where the coated article of FIG. 3 is laminated to another substrate 4.

Referring to FIGS. 3–4, after formation of the FIG. 3 structure as described above, the FIG. 3 structure is laminated to another substrate (e.g., glass substrate) 4 via PVB layer 5 thereby resulting in the heatable windshield of FIG. 4. Optionally, an opaque enamel layer (e.g., black or dark enamel) 51 may be provided on the interior surface of substrate 4 adjacent only relevant edge(s) thereof as shown in FIG. 4 in order to shield one or more of bus bars 7–9 from the view of persons viewing the heatable window from outside the vehicle. Also, in certain optional embodiments, an opaque enamel layer (e.g., black or dark enamel) 53 may be provided on the #4 surface of the windshield or window (i.e., on the outer surface of inner substrate 2) adjacent only relevant edge(s) thereof as shown in FIG. 4 in order to shield one or more of bus bars 7–9 from the view of persons viewing the heatable window from the vehicle interior. Instead of including enamel, layer(s) 51 and/or 53 may instead be of or include an opaque organic material such as a black primer.

Following formation of the FIG. 4 heatable window structure, it may be installed into a vehicle to complete a vehicle window assembly. When electric current is run through both conductive layers 29 and 39 of coating 3 via bus bars 7–9 heat is generated by the coating (i.e., by at least layers 29, 39). This heat may be used to defog the window, defrost the window, and/or melt snow/ice from the window or wipers therefore.

It is noted that the multi-layer coating 3 of FIGS. 2–4 is provided for purposes of example only, and this invention is not so limited. For example, this invention is also applicable to coatings having only one electroconductive layer, as well as to coatings including three or more conductive layers. Different dielectric layers may also be used. For example in this regard, reference is made to FIGS. 1 and 5–6.

In certain example embodiments, vehicle windows according to certain embodiments of this invention may be characterized as follows in Table 5, though the invention is not so limited unless the same is recited in the claims.

TABLE 5

| | Color/Transmission After HT; Laminated Form | |
|---|---|---|
| Characteristic | General | More Preferred |
| $T_{vis}$ (Ill. A, 2 deg.): | ≧70% | ≧75% |
| $T_{vis}$ (Ill. C, 2 deg.): | ≧70% | ≧75% |
| $R_gY$ (Ill. A, C; 2 deg.): | ≦11% | ≦9% |
| $a*_g$ (Ill. A, C; 2°): | −2.0 to +2.0 | −1.0 to +1.0 |
| $b*_g$ (Ill. A, C; 2°): | −10.0 to +1.0 | −8.0 to −2.0 |
| $R_fY$(Ill. A,C; 2 deg.): | ≦11% | ≦9% |
| $a*_f$ (Ill. A, C; 2°): | −3.0 to +1.0 | −2.0 to 0.0 |
| $b*_f$ (Ill. A, C; 2°): | −5.0 to 0.0 | −4.0 to −1.0 |
| $R_{solar}$: | ≧26% | ≧28% |
| Haze: | ≦0.4 | ≦0.3 |
| $T_{solar}$: | ≦50% | ≦48% |

Figure 5:
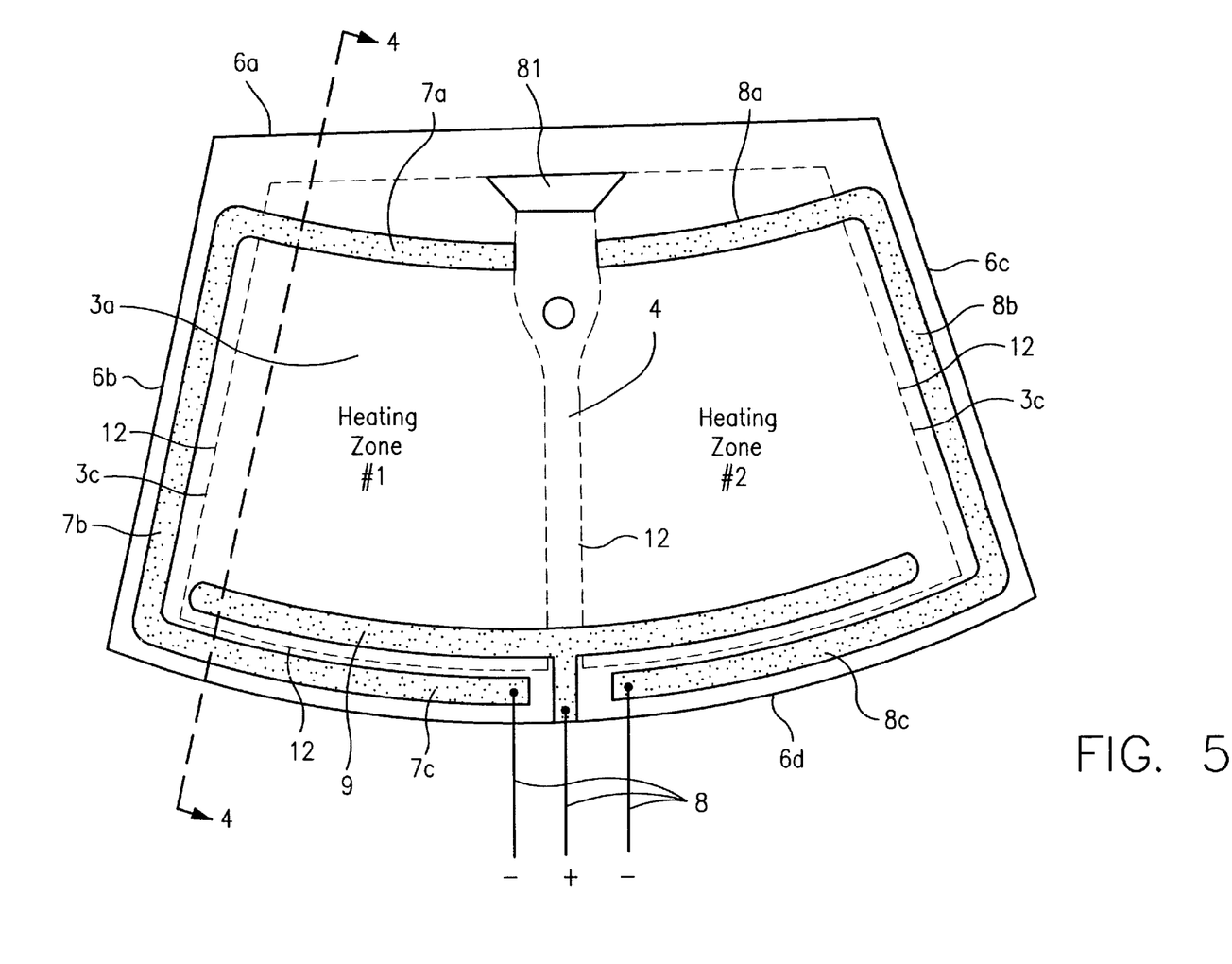
FIG. 5 is a top plan view of a heatable vehicle windshield according to another exemplary embodiment of this invention (absent opaque shielding layers for purposes of illustration simplicity).

FIG. 5 illustrates a windshield according to another embodiment of this invention. The FIG. 5 embodiment is the same as that shown in FIG. 1 and discussed above, except that toll window 81 (formed by a deletion in coating 3 at the illustrated area) is located above and/or between the adjacent ends of the top bus bar portions 7a and 8a. As a result, bus bar portions 7a and 8a are slightly lower down on the windshield in this FIG. 5 embodiment, although they are still located at an upper or top area of the windshield well above the windshield's center as in the FIG. 1 embodiment.

Figure 6:
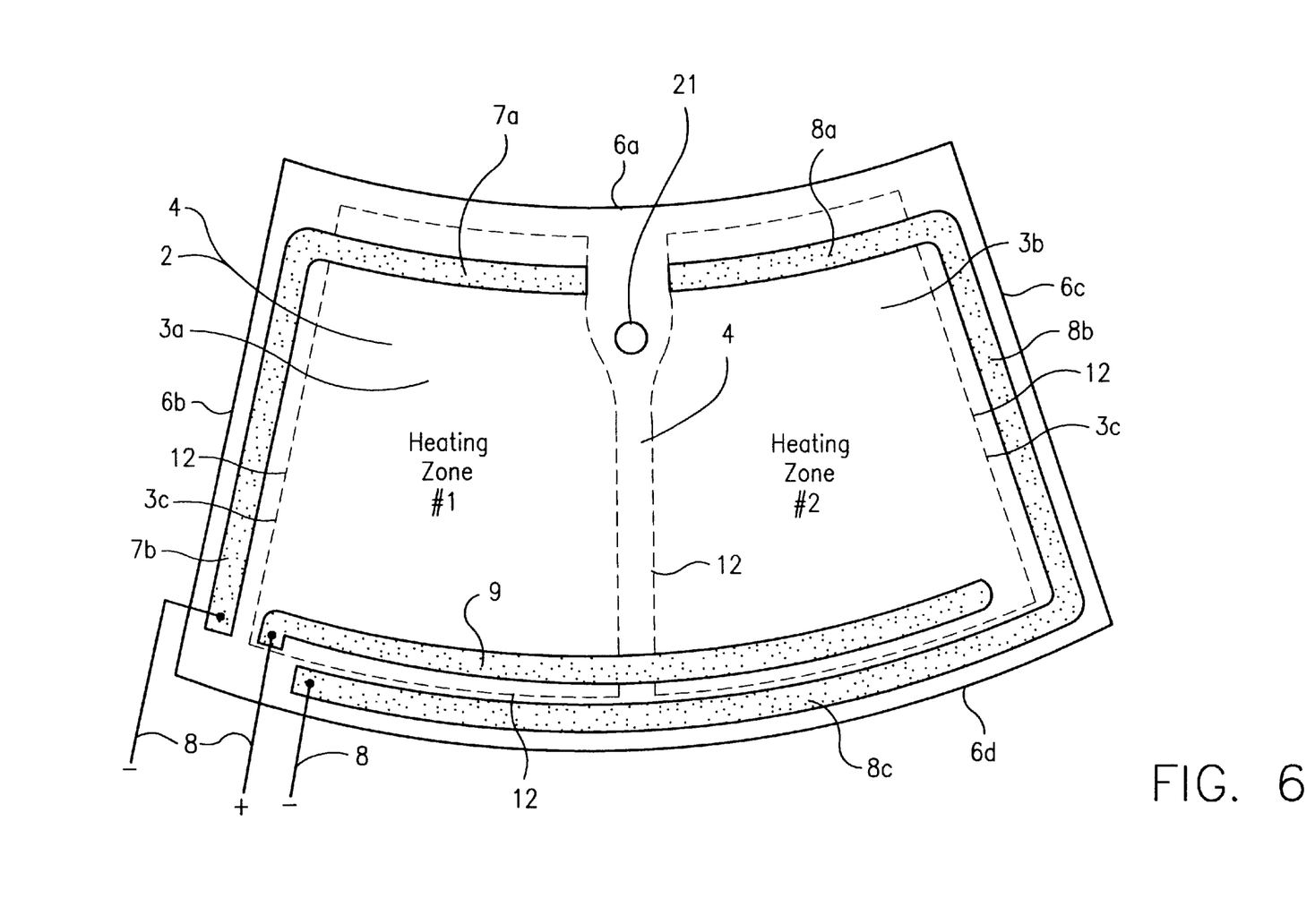
FIG. 6 is a top plan view of a heatable vehicle windshield according to another exemplary embodiment of this invention (absent opaque shielding layers for purposes of illustration simplicity).

FIG. 6 illustrates a windshield according to another embodiment of this invention. The FIG. 6 embodiment is the same as that shown in FIG. 1 and discussed above, except that in the FIG. 6 embodiment all three connectors 8 are located proximate a bottom corner of the windshield (while they are all still proximate the bottom edge of the windshield). This is because bus bar portion 8c has been extended to run across a substantial portion of the length of the bottom edge of the windshield, and portions 7c has been removed.

Once given the above disclosure many other features, modifications and improvements will become apparent to the skilled artisan. For example and without limitation, certain embodiments of this invention may include a bus bar arrangement inverted relative to that shown in FIG. 1, so that the single bus bar 9 is at an upper portion of the window, and the two bus bar portions 7a and 8a are at a lower portion of the window. Such other features, modifications and improvements are therefore considered to be a part of this invention, the scope of which is to be determined by the following claims:

What is claimed is:

1. A heatable vehicle windshield including a top edge, a bottom edge, and first and second side edges, the heatable vehicle windshield comprising:

first and second glass substrates laminated to one another with at least a polymer inclusive interlayer therebetween;

a coating located between said first and second substrates, said coating including at least one conductive layer;

first, second, and third conductive bus bars, wherein at least portions of said first, second, and third bus bars are in electrical communication with said conductive layer of said coating, so that when electric current is passed through said conductive layer via bus bars at least a portion of the windshield is heated;

wherein a top portion of said first bus bar and a top portion of said second bus bar are located in spaced apart relation at a top area of said windshield, and said third bus bar is located at a bottom area of said windshield;

wherein a first heating zone is defined by a portion of said coating in electrical communication with and between (i) said top portion of said first bus bar, and (ii) said third bus bar, and a second heating zone is defined by a different portion of said coating in electrical communication with and between (i) said top portion of said second bus bar, and (ii) said third bus bar;

wherein connection portions of said first and second bus bars are provided proximate or adjacent the bottom edge of the windshield so that corresponding electrical connectors in electrical communication with first, second, and third bus bars, respectively, are each attached to the windshield proximate the bottom edge thereof, at least one of said electrical connectors supplying electric current to said conductive layer of said coating via an external power source; and wherein a first portion of said third bus bar is located between a central area of the first heating zone and a bottom portion of said first bus bar, and a second portion of said third bus bar is located between a central area of the second heating zone and a bottom portion of said second bus bar, so that the central area of the first heating zone is provided between the top and bottom portions of the first bus bar and the central area of the second heating zone is provided between the top and bottom portions of the second bus bar.

2. The heatable windshield of claim 1, wherein said coating comprises first and second spaced apart portions, so that said top portion of said first bus bar is in electrical communication with said first portion of said coating and said top portion of said second bus bar is in electrical communication with said second portion of said coating.

3. The heatable windshield of claim 2, wherein said first portion of said coating helps define said first heating zone and said second portion of said coating helps define said second heating zone, and wherein said first and second spaced apart portions of said coating are electrically insulated from one another.

4. The heatable windshield of claim 3, wherein said first bus bar further includes a conductive extension portion which extends along or adjacent the first side edge of the windshield and is in electrical communication with said top portion of said first bus bar, and the second bus bar further includes a conductive extension portion which extends along or adjacent the second side edge of the windshield and is in electrical communication with said top portion of said second bus bar.

5. The heatable windshield of claim 4, wherein said conductive extension portions of said first and second bus bars, respectively, are laterally spaced from said coating.

6. The heatable windshield of claim 5, wherein said bus bars comprise silver frit material.

7. The heatable windshield of claim 1, wherein said polymer inclusive interlayer comprises PVB.

8. A heatable window comprising:

at least one substrate supporting a coating;

first, second, and third conductive bus bars, wherein at least portions of said first, second, and third bus bars are in electrical communication with a conductive layer of said coating, so that when electric current is passed through said conductive layer via bus bars at least a portion of the window is heated;

wherein a first portion of said first bus bar and a first portion of said second bus bar are located in spaced apart relation from one another at an upper area of said window above a center of said window, and said third bus bar is at least partially located at a lower area of said window below the center of the window;

a first heating zone defined by a first portion of said coating in electrical communication with and between a) said first portion of said first bus bar, and b) said third bus bar;

a second heating zone defined by a second portion of said coating in electrical communication with and between a) said first portion of said second bus bar, and b) said third bus bar;

wherein connection portions of said first and second bus bars are provided proximate or adjacent the lower area of the window so that corresponding electrical connectors in electrical communication with the first, second, and third bus bars, respectively, are each attached to the window proximate the lower area thereof, at least one of said electrical connectors supplying electric current to said conductive layer of said coating via an external power source; and wherein a first portion of said third bus bar is located between a central area of the first heating zone and a second portion of said first bus bar, and a second portion of said third bus bar is located between a central area of the second heating zone and a second portion of said second bus bar, so that the central area of the first heating zone is provided between the first and second portions of the first bus bar and the central area of the second heating zone is provided between the first and second portions of the second bus bar.

9. The heatable window of claim 8, wherein said coating comprises first and second spaced apart portions, so that said first portion of said first bus bar is in electrical communication with said first portion of said coating and said first portion of said second bus bar is in electrical communication with said second portion of said coating.

10. The heatable window of claim 9, wherein said first portion of said coating helps defines said first heating zone and said second portion of said coating helps define said second heating zone.

11. The heatable window of claim 8, wherein the window comprises a vehicle windshield.

12. The heatable window of claim 11, wherein said first bus bar further includes a conductive extension portion which extends along or adjacent a first side edge of the windshield and is in electrical communication with said first portion of said first bus bar, and said second bus bar further includes a conductive extension portion which extends along or adjacent a second side edge of the windshield and is in electrical communication with said first portion of said second bus bar.

13. The heatable window of claim 12, wherein said conductive extension portions of said first and second bus bars, respectively, are laterally spaced from said coating.

14. The heatable window of claim 8, wherein said third bus bar is approximately T-shaped.

15. A heatable window comprising:
   at least one substrate supporting a heatable conductive layer;
   first, second, and third spaced apart bus bars each in electrical communication with said heatable conductive layer;
   a first heating zone including a first portion of said conductive layer defined between a top or upper portion of said first bus bar and said third bus bar;
   a second heating zone including a different second portion of said conductive layer defined between a top or upper portion of said second bus bar and said third bus bar;
   wherein said top or upper portions of said first and second bus bars, respectively, are located in spaced relation from one another at an upper area of said window above a center of said window, and said third bus bar is located at a lower area of said window below the center of said window; and
   wherein a portion of said third bus bar is located between a central area of the second heating zone and a bottom portion of said second bus bar, so that the central area of the second heating zone is provided between the top and bottom portions of the second bus bar.

16. The heatable window of claim 15, wherein connection portions of said first and second bus bars are provided proximate or adjacent a bottom edge of the window so that corresponding electrical connectors in electrical communication with the first, second, and third bus bars, respectively, are each attached to the window proximate the bottom edge thereof, at least one of said electrical connectors supplying electric current to said conductive layer via an external power source.

17. The heatable window of claim 15, wherein the top or upper portions of the first and second bus bars are each at least partially located below a toll window deletion portion formed in the heatable conductive layer.

18. The heatable window of claim 15, wherein connection portions of said first and second bus bars are provided proximate or adjacent a bottom corner of the window so that corresponding electrical connectors in electrical communication with the first, second, and third bus bars, respectively, are each attached to the window proximate the bottom corner thereof, at least one of said electrical connectors supplying electric current to said conductive layer via an external power source.

19. The heatable windshield of claim 1, wherein the coating comprises first and second conductive layers comprising Ag separated from each other by at least one dielectric layer, and wherein the first, second, and third bus bars are each in electrical communication with each of the first and second conductive layers comprising Ag.

20. The heatable window of claim 15, wherein a coating supported by the substrate comprises first and second conductive layers comprising Ag separated from each other by at least one dielectric layer, and wherein the first, second, and third bus bars are each in electrical communication with each of the first and second conductive layers comprising Ag.

* * * * *